United States Patent [19]
Lossini

[11] 3,974,545
[45] Aug. 17, 1976

[54] SLIDE LOCKING ASSEMBLY
[75] Inventor: Elio Lossini, Johnston, R.I.
[73] Assignee: Raybeth Tool & Die Co., Inc., Providence, R.I.
[22] Filed: Oct. 6, 1975
[21] Appl. No.: 620,014

[52] U.S. Cl. .................................. 24/116 R; 63/4
[51] Int. Cl.² .................... F16G 15/00; A44C 5/02
[58] Field of Search ....... 24/116 R, 116 A, 265 CC, 24/230 B, 201 BN, 49 S; 63/2, 3, 4

[56] References Cited
UNITED STATES PATENTS

| 2,251,463 | 8/1941 | Myrberg | 24/265 CC |
|---|---|---|---|
| 2,552,415 | 5/1951 | Fachon | 24/265 CC |
| 2,586,758 | 2/1952 | Zerr | 24/116 R X |
| 2,856,661 | 10/1958 | Holl | 24/116 R |
| 3,347,037 | 10/1967 | Klang | 24/116 R X |

FOREIGN PATENTS OR APPLICATIONS

| 1,175,440 | 11/1958 | France | 24/116 R |
|---|---|---|---|
| 249,453 | 4/1948 | Switzerland | 24/265 CC |

*Primary Examiner*—Donald A. Griffin
*Attorney, Agent, or Firm*—Salter & Michaelson

[57] ABSTRACT

A slide locking assembly for use with chain members of jewelry articles such as necklaces, bracelets and the like comprising a housing for receiving said chain members, said housing comprising inner and outer case sections, means for maintaining separation between the chain members, and spring means for urging portions of said chain members into contact with the housing to produce a frictional drag thereon, wherein the component parts of such an assembly may be easily hand assembled by snap-fit locking engagement of the mating case sections.

10 Claims, 15 Drawing Figures

SLIDE LOCKING ASSEMBLY

BACKGROUND OF THE INVENTION

This invention relates generally to slide lock assemblies of the type adapted to receive the free ends of a looped flexible chain, whereby movement of the slide lock relative to the chain portions extending therethrough permits the size of the loop to be selectively increased or decreased.

Slide lock assemblies wherein the chain members receive therein may be adjusted in relative length by movement in relationship to the slide assembly are well known and are extensively used in jewelry constructions, such as bracelets, necklaces, and the like. Such assemblies normally utilize a spring means or similar-type mechanisms which require rather intricate assembly of the slide and its component parts, namely, the matching case portions and the spring means. Such interconnection is normally accomplished by the use of screw members or the insertion and/or subsequent bending of lock tabs or other fastening mechanisms which require the use of tools. Such bending and/or screwing operations during assembly are not only time consuming and costly but also frequently may dislodge the placement of the spring means; and, accordingly, it would be desirable to eliminate such prior art fastening devices and their accompanying drawbacks.

SUMMARY OF THE INVENTION

The present invention overcomes these prior art shortcomings while providing a slide lock assembly comprising a housing formed of inner and outer case sections adapted for interlocking assembly with each other and further provided with means for maintaining separation of the chain members passing therethrough, and spring means maintaining the necessary frictional drag thereon. Respective side wall portions of the inner and outer case sections are in turn provided with inwardly extending projections and openings whereby such case sections are superimposed in snap-fit locking engagement with each other.

It is therefore a primary object of the instant invention to provide a slide locking assembly which is of simple, low-cost construction and can be readily hand assembled without the need for tools or complex operations.

Another object of this invention is the provision of a slide locking assembly wherein the spring means thereof is retained in position during assembly and wherein such assembly is not apt to dislodge the positioning of such spring means.

A still further object of this invention is the provision of a slide locking assembly which is easily adapted for the receipt of more than two chain members, i.e., four, six, etc., and wherein the assembly ease and spring means retention is still maintained.

Other objects, features and advantages of the invention will become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

FIGS. 1 to 7 depict embodiments of the invention wherein two chain members are utilized in the necklace construction, whereas FIGS. 8 to 14 depict an embodiment wherein more than two, i.e., four, chain members are utilized. The term "necklace" as used herein refers to all jewelry constructions in which a slide locking assembly has utility and specifically includes, by way of example rather than limitation, bracelets and other decorative or utilitarian devices. Although not specifically shown, one construction anticipated is that of a necklace in the form of a running length of chain formed into a loop by a conventional clasp member, each chain member forming a side of the loop. The slide locking assembly receives the chain members of both sides of this loop so as to form a primary neck encircling loop and a lower secondary loop as for suspension of an ornament. The slide locking assembly of the present invention thus serves to vary or adjust the relative dimension of the upper and lower loops by relative positioning of such side locking assembly relative to the looped chain members.

Figure 1:
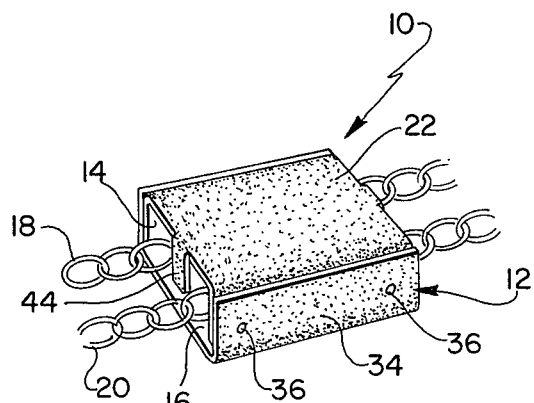
FIG. 1 is a perspective view of a locking slide assembly constructed in accordance with the instant invention applied to two lengths of running chain as would be characteristic in common necklace constructions wherein the chain members form a closed loop and relative movement of the slide locking assembly enables the dimension of such loop to be varied.
Figure 2:
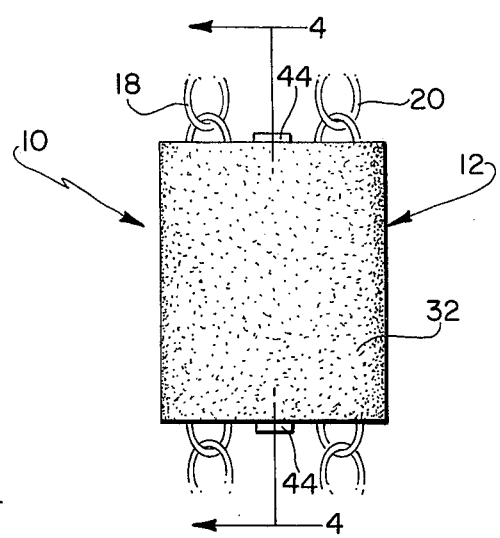
FIG. 2 is a top plane view of the slide locking assembly shown in FIG. 1.
Figure 5:
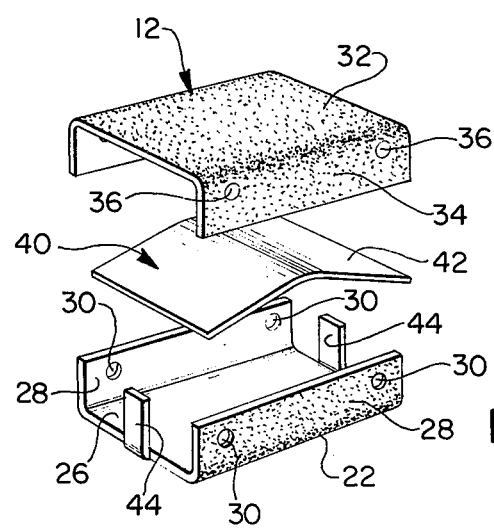
FIG. 5 is an exploded or assembly view showing the components of the slide locking assembly prior to assembly thereof.

Referring now to the drawings and particularly FIG. 1 thereof, the slide locking assembly 10 includes a housing 12 having separate longitudinally extending channels 14 and 16 for receipt and separation of the chain members 18 and 20 which as previously indicated may be segments of a single looped chain. Housing 12 as best shown in FIG. 5 of the drawings includes an inner case 22 and an outer case 24 adapted for snap-fit engagement with each other, as will hereinafter be more fully explained. Each case may be formed of brass, steel or other suitable material. Inner case 22 further includes a bottom wall 26 and side walls 28 upstanding therefrom. Each inner case side wall 28 is further provided with at least one and preferably a pair of depressions 30 extending inwardly from the outer surface of such side wall. Such depressions 30 may take the form of openings extending entirely through the side wall 28 as depicted or may be in the form of concave or otherwise inwardly bent portions.

Figure 6:
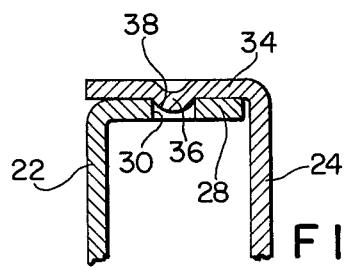
FIG. 6 is a partial enlarged sectional view taken along line 6—6 of FIG. 3 and showing in particular the mechanism whereby the upper and lower cases are engaged in snap-fit relationship to each other.
Figure 3:
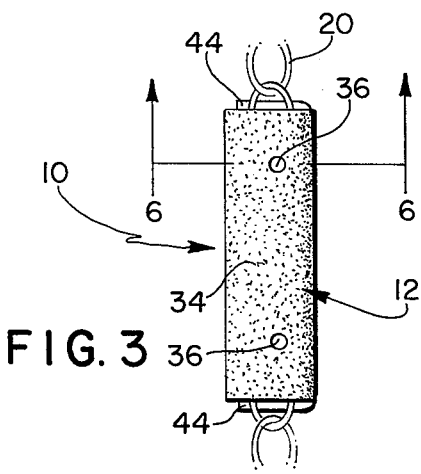
FIG. 3 is a side view of the slide locking assembly shown in FIG. 1.
Figure 6A:
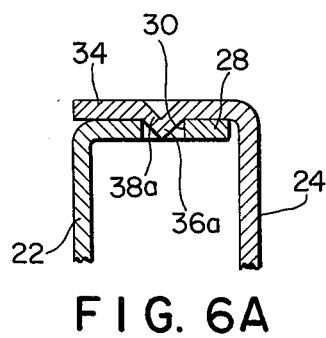
FIG. 6a is a partial side sectional view similar to FIG. 6 but showing a different embodiment wherein the interconnection means includes a pronounced barb construction.
Figure 4:
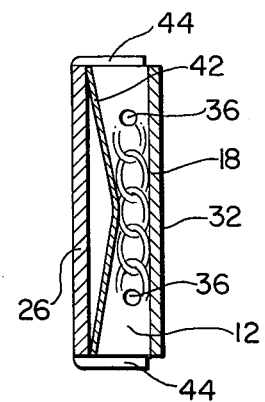
FIG. 4 is a side sectional view taken along line 4—4 of FIG. 2.

The outer case 24 includes a generally planar top wall 32 and side walls 34 downwardly extending therefrom. As with the inner case side walls 28, the outer case side walls 34 are provided with at least one and preferably a pair of spaced projections 36 extending inwardly from the outer surface thereof and in alignment with the depressions 30. Such projections 36 may take the form of inwardly projecting dimples as depicted in FIG. 6 or in the form of barbs 36a as shown in FIG. 6a of the drawings. In either case, it should be recognized that the forward or terminal leading edge of the projection is rather smoothly tapered at 38 in the dimpled construction as shown in FIG. 6. and actually takes the form of a sloping ramp 38a in the barb 36a construction shown in FIG. 6a of the drawings. The forward edge of projection 36 is proximate the terminus of the outer side wall 34, that is, to the left as shown in FIGS. 6 and 6a. The projections 36 and the depressions 30 may also be of elongated configuration rather than circular as depicted in the drawings.

The housing 12 is assembled by the snap-fit engagement of the projections 36 of the outer case 24 into the depressions 38 of the inner case 22 when the two cases are manually forced together. The outer case may be slightly outwardly tapered or flared so that there is a relative larger receiving opening for the inner case. In practice, the side walls of the inner and outer cases are contacted at one side with their respective projections and depressions in alignment and with the top wall of the outer case slightly upwardly inclined so that the other respective side walls of the inner and outer cases are just slightly contacting, the top wall 32 then being forced downwardly, and the remaining projections engaged with their respective depressions. With such assembly technique or other techniques where a relative outward flare between the respective side walls is helpful, it is preferable to incorporate such outward flare in the outer case, since the inner case 22 is positioned lowermost for receipt and retention of spring means 40 during assembly.

The spring means shown in the FIGS. 1 to 7 embodiments of the invention takes the form of a single leaf spring 42 formed of tempered brass, beryillium copper or other suitable material. The leaf spring 42 is upwardly bowed at the center thereof so as to in effect form a reduction in the height of the channels 14 and 16 available for receipt of the chain members 18 and 20 so as to assure a frictional urging of the appropriate chain member against the bottom surface of the top wall 32 of the outer case 24. This frictional engagement assures that as the chain member is pulled link by link along its appropriate channel it will not slide too loosely and will remain where positioned when the pulling force terminates, as when the particular desired necklace loop adjustments have been made by the wearer. The spring 42 is maintained in position not only by contact with the inner sides of the side walls 28 but also, as can best be seen by reference to FIGS. 4 and 5 of the drawing, by a pair of upstanding tabs 44 centrally positioned along the ends of the bottom wall 26 of the inner case 22. The tabs 44 further serve to divide the space within housing 12 available for the chain members 18 and 20 into the aforementioned channels 14 and 16. It is thus apparent that the present construction enables the leaf spring means to be maintained in position while the housing is being assembled and locked in position by the snap-fit engagement of the projections within the depressions.

Figure 7:
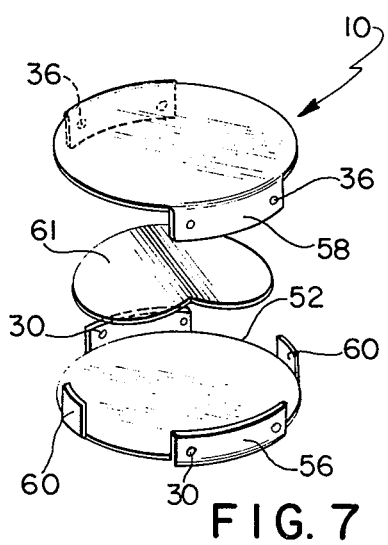
FIG. 7 is an assembly view similar to FIG. 5 but showing an embodiment wherein the overall configuration of the slide lock assembly is circular rather than rectangular.

FIG. 7 of the drawings shows another embodiment of the invention wherein the overall configuration of the housing 12 is circular. Therein depicted is an inner case 52 and an outer case 54, each having respective side wall segments or portions 56 and 58, respectively. The inner case 52 is further provided with upstanding tabs 60 diametrically opposed to each other and positioned midway between the side wall segments 56. In this way, then, when the cases are assembled as in the same manner as previously indicated, the openings formed between the cooperating side wall segments 56 and 58 and the upstanding tabs 60 form the entrance and exit portions of the separate channels for receipt and separation of the chain members. It should also be brought out that the housing of the slide locking assembly of the present invention may not only be rectangular in configuration as shown in FIGS. 1 to 6, circular as shown in FIG. 7, but may further take other shapes, i.e., hexagonal, octagonal, oval, etc. As will be obvious, the spring will always confirm to the configuration of the housing, it being noted that the spring 61 in FIG. 7 is round so as to snugly fit within the inner case 52, and is upwardly bowed at its center, in the same manner as aforesaid spring 42.

Figure 8:
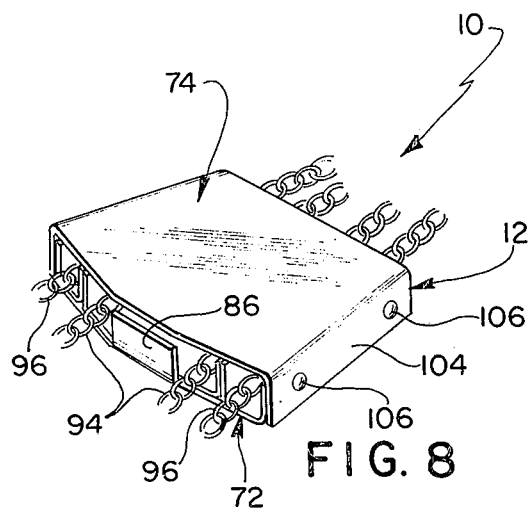
FIG. 8 is a perspective view similar to FIG. 1 but showing an embodiment wherein more than two, i.e., four, chain members are contained in the slide housing.
Figure 9:
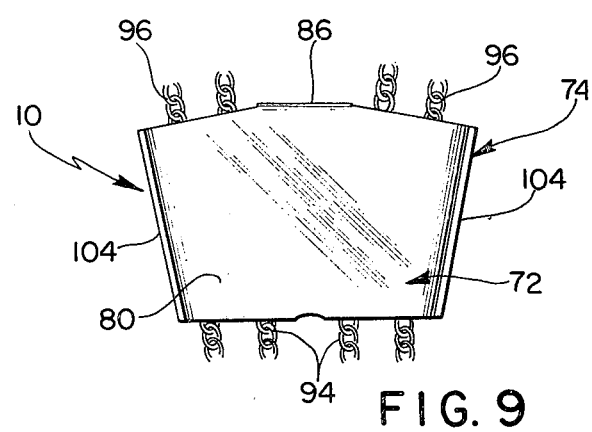
FIG. 9 is a top plane view of the slide locking assembly embodiment shown in FIG. 8.
Figure 10:
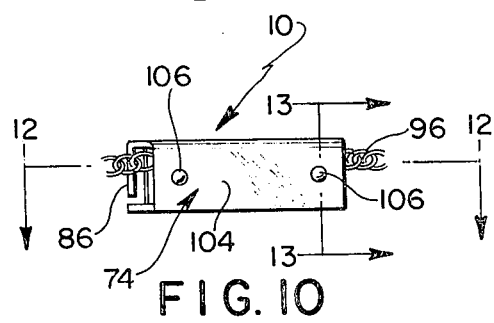
FIG. 10 is a side view thereof.
Figure 11:
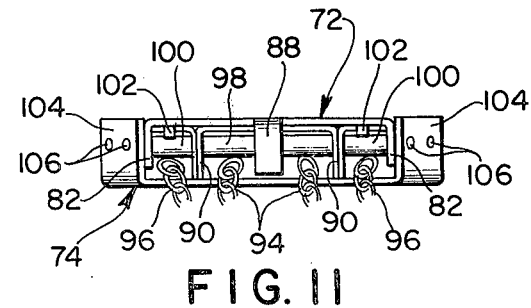
FIG. 11 is a top view of the slide lock assembly shown in FIG. 9.
Figure 12:
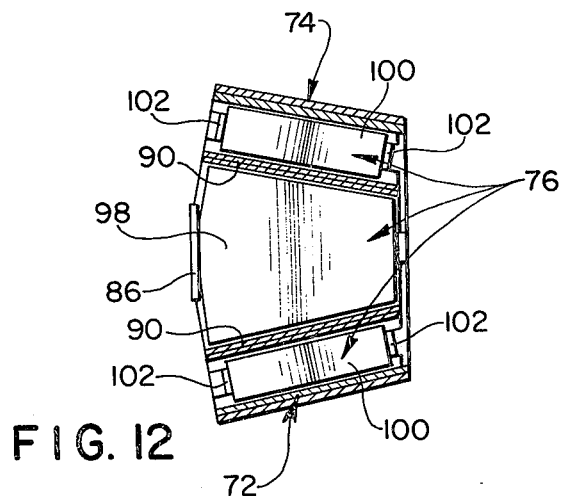
FIG. 12 is a sectional view thereof taken along the line 12—12 of FIG. 10.

The slide locking assembly of the present invention may also be constructed to receive four or more chain members, as depicted in FIGS. 8 to 14 of the drawings. Therein, the housing 12 comprises an inner case 72 and outer case 74, spring means 76, and a separator plate 78. The cases have slightly outwardly flared forward ends so as to facilitate the convergence of the neck encircling upper loop into the slide locking assembly in the necklace configuration anticipated. As in the previous embodiments, the inner case 72 is provided with bottom wall 80 having side walls 82 upstanding therefrom. The side walls in turn are provided with depressions 84 adjacent each end thereof. The bottom wall 80 is provided with upstanding tabs, namely, forward tab 86 and a rear tab 88; the forward tab 86 being of greater lateral dimension to reflect the outward flare at the forward ends of the inner and outer cases. Such outward flare of the cases in cooperation with the greater lateral extent of the forward tab 86 provide a plurality of receiving channels with a converging aspect as best shown in FIGS. 8 and 9.

The separator plate 78 is further provided with inwardly spaced, upstanding, longitudinally orientated walls 90 which are inwardly spaced from the side edges 92 thereof so that when the separator plate 78 is placed on the bottom wall 80 of the inner case 72 and positioned in relationship thereto by contact with the side walls 82 and the upstanding tabs 86, 88, the walls 90 thereof will further separate the available space within the housing into primary 94 and secondary channels 96. The chain members passing through the primary channels 94 are urged against the outer case by a single leaf spring 98 retained in position on the separator plate 78 by contact with the walls 90 thereof and the tabs 86, 88. Each secondary channel 96 is provided with a separate leaf spring 100 which is held against sideways motion by contact with outer portions of the walls 90 and the inner portions of the side walls 82. The separator plate 78 is further provided with upwardly struck lugs 102. The lugs are positioned outwardly of the walls 90 at each edge of the separator adjacent the corners thereof. These lugs 102 serve to retain the individual leaf springs 100 against lengthwise displacement.

Figure 14:
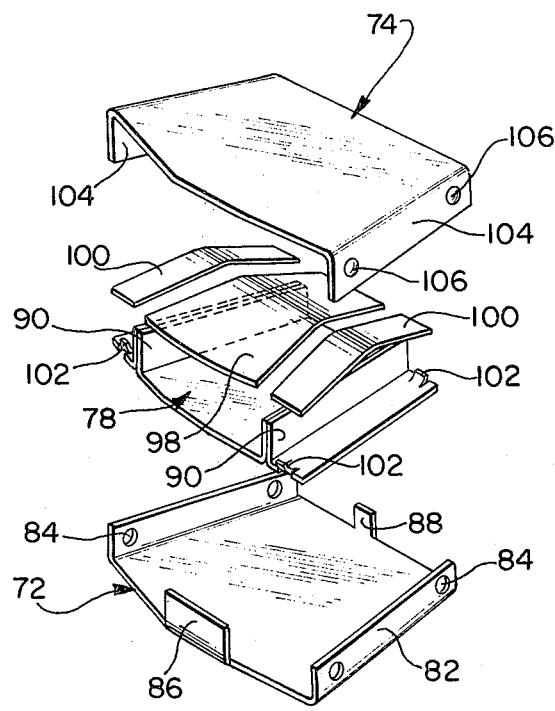
FIG. 14 is an exploded or assembly view showing the various components of the slide locking assembly embodiment shown in FIGS. 8 to 13 prior to assembly thereof.
Figure 13:
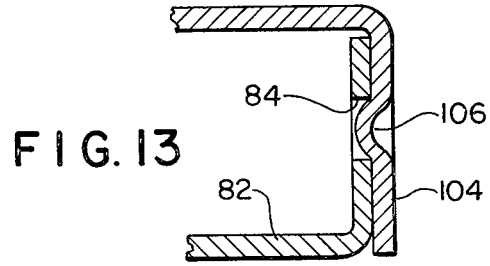
FIG. 13 is a partial enlarged sectional view taken along line 13—13 of FIG. 10.

The outer case 74, as in the other embodiments shown, is provided with downwardly extending side walls 104 having inwardly extending projections 106. The component parts are assembled as shown in FIG. 14 by the snap-fit engagement of the projections 106 into the depressions 84 which may be in the respective dimple opening configuration shown or the modifications previously explained with regard to FIGS. 6 and 6a.

As with the previous embodiments, the final assembly of the outer case with the inner case to form the housing may be with the chain members in place in their respective channels; or alternatively the chain members may be separately inserted into the already assembled slide locking assembly of the present invention by means of a wire or similar lead-in device.

While there is shown and described herein certain specific structures and embodiments of the invention, it will be manifest to those skilled in the art that various other modifications thereof may be made without departing from the spirit and scope of the underlying inventive concept and that the same is not limited to the particular forms herein shown and described except insofar as indicated by the scope of the appended claims.

What is claimed is:

1. In a chain assembly including chain members for necklace constructions and the like, a slide locking assembly through which said chain members extend, said slide assembly comprising a housing having inner and outer case sections, said inner case having a bottom wall, upstanding side walls connected thereto and a centrally positioned integral tab upstanding from each end thereof, said side walls and said tabs defining longitudinally orientated channels along said inner case for receiving and maintaining separation between said chain members, said outer case having a generally planar top and side walls downwardly extending therefrom, said inner case side walls having a plurality of inwardly extending depressions therein, said outer case side walls having a plurality of inwardly extending projections thereon, said projections adapted for snap-fit engagement within said depressions when said inner and outer case sections are assembled, and spring means supported by said inner case bottom wall for urging said chain members into frictional contact with said outer case top wall, whereby varied relative positions between said chain members and said slide locking assembly may be maintained.

2. In the chain assembly of claim 1, said spring means comprising a leaf spring upwardly bowed centrally thereof, thus reducing the height of said longitudinal channels centrally thereof and consequently increasing the frictional drag on said chain members.

3. In the chain assembly of claim 1, said outer case side wall projections including at least gently sloped lower portions thereof for initial sliding contact with portions of said inner case side walls.

4. In the chain assembly of claim 1, said outer case side wall projections comprising dimples inwardly upset from side wall portions thereof.

5. In the chain assembly of claim 4, said inner case depressions comprising openings extending completely through said inner case side wall, said openings receiving said dimples.

6. In the chain assembly of claim 1, said outer case side walls having a slight outward taper for receiving said inner case side walls.

7. In the chain assembly of claim 1, said tabs contacting said spring means so as to prevent lengthwise movement of said spring means relative to said inner case.

8. In the chain assembly of claim 7, said slide locking assembly including a generally planar separator plate supported by said inner case bottom wall and retained from relative lengthwise movement therewith by said tabs, said plate having inwardly spaced upstanding longitudinally oriented walls further dividing each of said channels into primary and secondary chain member receiving channels, said primary channels being centrally positioned.

9. In the chain assembly of claim 8, there being two primary channels and two secondary channels, said primary channels having a single leaf spring retained by said tabs and said plate walls, each of said secondary channels having a separate leaf spring respectively retained on either side thereof by a plate wall and an inner case side wall.

10. In the chain assembly of claim 9, said secondary channel leaf springs being retained from relative lengthwise movement by lugs upwardly extending from end wall portions of said separator plate.

* * * * *